United States Patent
Okamura

(10) Patent No.: US 6,636,964 B1
(45) Date of Patent: Oct. 21, 2003

(54) METHOD AND APPARATUS FOR LOADING AN OBJECT-ORIENTED OPERATING SYSTEM BY PROVIDING AN INITIAL EXECUTION ENVIRONMENT AND MIGRATING TO A CORE EXECUTION ENVIRONMENT THEREAFTER

(75) Inventor: Hideaki Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/531,819

(22) Filed: Mar. 21, 2000

(30) Foreign Application Priority Data

Mar. 23, 1999 (JP) ............................................ 11-078191

(51) Int. Cl.[7] .............................................. G06F 9/445
(52) U.S. Cl. .......................................... 713/2; 709/332
(58) Field of Search ............................ 713/2; 707/103; 717/103; 709/332

(56) References Cited

U.S. PATENT DOCUMENTS

| | | | | |
|---|---|---|---|---|
| 5,280,627 A | * | 1/1994 | Flaherty et al. ................. | 713/2 |
| 5,379,431 A | * | 1/1995 | Lemon et al. ................. | 710/10 |
| 5,459,865 A | * | 10/1995 | Heninger et al. ........... | 709/108 |
| 5,574,915 A | * | 11/1996 | Lemon et al. ............... | 712/220 |
| 6,321,358 B1 | * | 11/2001 | Anderson .................... | 714/763 |
| 6,327,653 B1 | * | 12/2001 | Lee ............................. | 713/100 |
| 6,334,149 B1 | * | 12/2001 | Davis et al. ................. | 709/219 |

FOREIGN PATENT DOCUMENTS

DE          4211678 A1  * 10/1993  ............. G06F/9/44

* cited by examiner

Primary Examiner—Thomas Lee
Assistant Examiner—Eric Chang
(74) Attorney, Agent, or Firm—Frommer Lawrence & Haug LLP; William S. Frommer

(57) ABSTRACT

An operating system (OS) is flexibly initialized by efficiently utilizing a memory space. An initial execution environment is first created on a target host. An OS initializing object is executed in the initial execution environment. A core execution environment and other objects are created and initialized based on a boot information structure. After the core execution environment has been created and initialized, the OS initializing object is migrated from the initial execution environment to the core execution environment. Then, the initial execution environment is deleted.

14 Claims, 15 Drawing Sheets

FIG. 10

| 120 | 121 | 122 |
|---|---|---|
| EXECUTION OPERATION INDEX | EXECUTION OBJECT ID | EXECUTION OPERATION ENTRY POINT |
| - - - - - - - - | - - - - - - - - | - - - - - - - - |

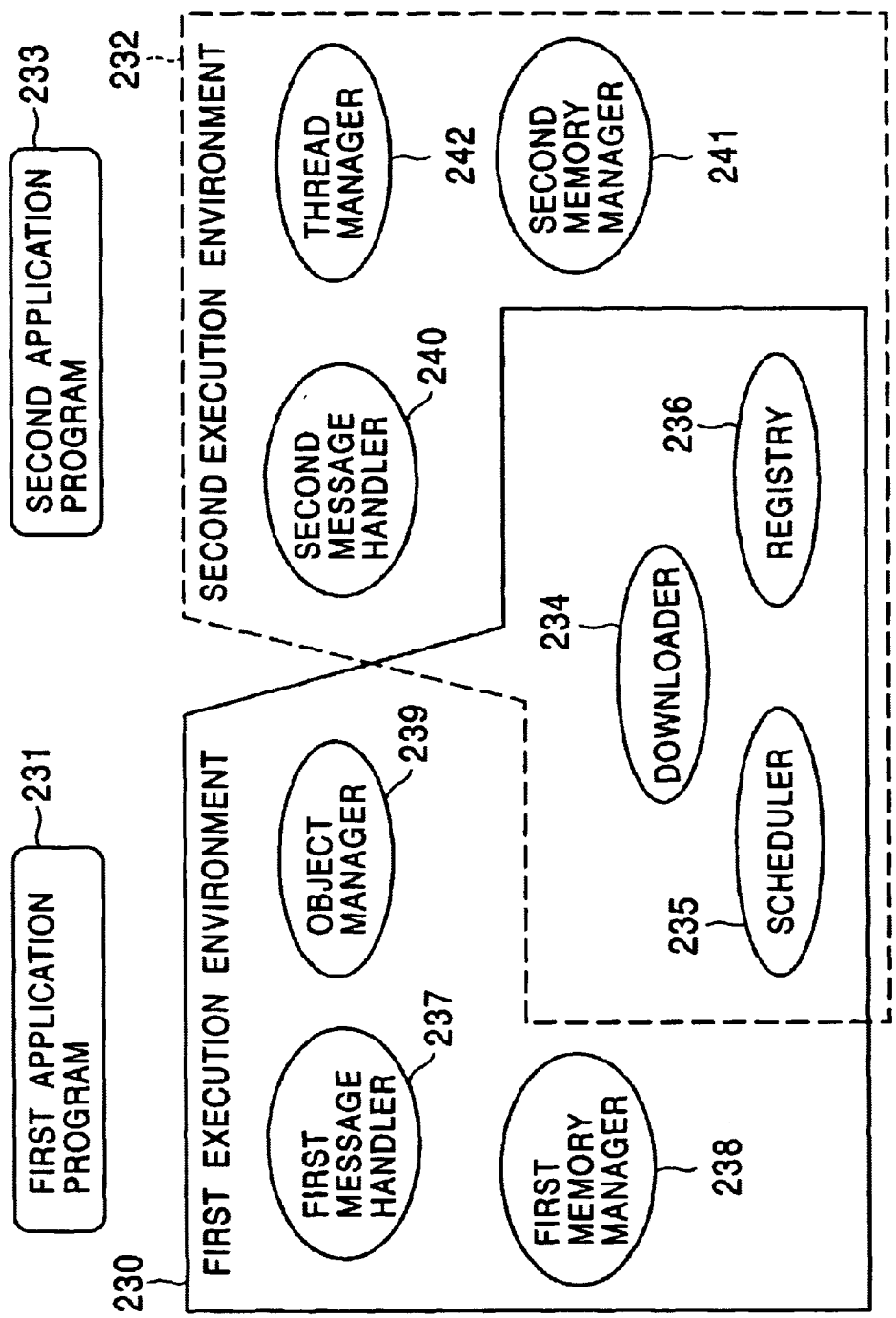

METHOD AND APPARATUS FOR LOADING AN OBJECT-ORIENTED OPERATING SYSTEM BY PROVIDING AN INITIAL EXECUTION ENVIRONMENT AND MIGRATING TO A CORE EXECUTION ENVIRONMENT THEREAFTER

BACKGROUND OF THE INVENTION

1. Field of the Invention

The present invention relates to an information processing apparatus, a program initializing method, and a program providing medium, all of which are suitable for use in object-oriented operating systems.

2. Description of the Related Art

An operating system (hereinafter referred to as an "OS") using object-oriented techniques is referred to as an object-oriented OS. Elements of an object-oriented OS are formed into modules as objects, thereby advantageously increasing the flexibility of a system.

In some object-oriented OSs, objects forming basic elements of the OS possess an execution mechanism similar to a mechanism for objects forming an application program running on the OS. The above type of OS is referred to as a "pure object-oriented OS". In the pure object-oriented OS, services provided by the OS are defined by a set of objects, thereby making it possible to more flexibly construct the OS. More specifically, for example, before starting the OS, objects providing services may be combined according to functions required by a user, and it is possible to dynamically add or delete functions to or from the OS with the purpose of optimizing or updating the OS (without the need for stopping the system).

In the pure object-oriented OS, a plurality of execution environments may be prepared for the objects, and a frame for selecting an execution environment in response to a request of an application program can be easily provided. By selecting a suitable execution environment, the application programs are able to receive services which are optimal for execution models unique to the programs. In the following description, the execution environments are defined as a set of services provided by an OS and support the operations of application programs. The execution environments may include concurrent object execution environments, Java program execution environments, portable operating system interface (POSIX) execution environments, etc.

In contrast, according to a conventional OS, which is a non-object-oriented OS, as shown in FIG. 13, only a single execution environment 202 is provided for all the application programs, such as a first application program 200 and a second application program 201. In another conventional OS, as shown in FIG. 14, a basic execution environment 210, and a plurality of execution environments, such as a first execution environment 211 and a second execution environment 212, operating on the basic execution environment 210, are prepared in advance, and a first application program 213 and a second application program 214 are operated under the corresponding execution environments. Whether the OS is provided with a single execution environment or a plurality of execution environments, as shown in FIGS. 13 and 14, respectively, the types of execution environments to be provided are fixed when the OS is started.

Accordingly, in the known OSs, in adding a new execution environment, it is necessary to interrupt the operation of the OS, select the required execution environment, and then restart the OS. Additionally, when the same services are shared by a plurality of execution environments, it is necessary to integrate the services into a basic execution environment. That is, according to conventional OSs, a plurality of execution environments cannot be flexibly provided.

Typically, in conventional OSs, initialization is performed by a series of steps, such as those shown in FIG. 15. An example of an initializing process in a conventional OS is discussed below with reference to FIG. 15.

In step S220, hardware is initialized, for example, registers are set and input/output devices are initialized. Then, in step S221, portions shared by the individual software modules, such as name management service, memory management service, and so on are initialized.

It is then determined in step S222 whether all the execution environments have been initialized. If the outcome of step S222 is no, the process proceeds to step S223 in which the corresponding execution environment is initialized. The process then returns to step S222.

If the result of step S222 is yes, the process proceeds to step S224. It is determined in step S224 whether all the software modules to be operated have been initialized. If the outcome of step S224 is no, the process proceeds to step S225. If the result of step S224 is yes, the process proceeds to step S228.

In step S225, a memory required for a software module which is not yet initialized is assigned. Subsequently, in step S226, a structure required for this software module is generated. Then, in step S227, an initializing function is called for this software module, and the process returns to step S224.

In step S228, a software module which is to be operated first is called, and the initializing process is completed.

In some conventional OSs, each software module may initialize itself rather than depending on the above-described initializing process.

On the other hand, a pure object-oriented OS is formed of, as illustrated in FIG. 16, a set of a plurality of objects, and provides execution environments by flexibly utilizing these objects. Thus, according to the pure object-oriented OS, by adding or deleting an object, an execution environment can be easily added, deleted, or updated. Additionally, in the pure object-oriented OS, an object can be easily shared by a plurality of execution environments.

In FIG. 16, a first execution environment 230 is used as a concurrent object-oriented execution environment, which runs a first application program 231, and a second execution environment 232 is used as a non-object-oriented execution environment, which runs a second application program 233. In this pure object-oriented OS, objects, such as a downloader 234, a scheduler 235, and a registry 236, are shared by the first execution environment 230 and the second execution environment 232. In addition to those objects shared with the second execution environment 232, the first execution environment 230 includes a first message handler 237, a first memory manager 238, and an object manager 239. In addition to the objects shared with the first execution environment 230, the second execution environment 232 includes a second message handler 240, a second memory manager 241, and a thread manager 242.

According to the pure object-oriented OS, only the first execution environment 230 may be provided when the OS is started. Then, if the necessity arises for operating the second application program 233, the second execution environment 232 can be provided by adding the second message handler 240, the second memory manager 241, and the thread manager 242. In this manner, according to the pure object-oriented OS, a plurality of execution environments can be flexibly provided as needed.

In the pure object-oriented OS as described above, if a system is initialized according to an initializing process similar to the aforementioned process, the following three problems are raised, thereby failing to sufficiently exhibit the characteristics of the pure object-oriented OS.

According to the above-described initializing process, an adequate consideration is not given to the presence of a plurality of execution environments. In conventional OSs, each software module possesses information of an execution environment to which the software module belongs. Additionally, a software module forming an execution environment installs another software module which is to be executed under the execution environment according to a unique technique, and in some cases, a software module initializes itself. Thus, according to the above-described OS initializing process, an execution environment to which each software module belongs cannot be identified in advance. Consequently, processing executed in common for a plurality of execution environments, such as searching for a software module or checking for the presence of an execution environment on a system into which a software module is to be installed cannot be performed, thereby making it difficult to efficiently utilize a memory space.

Moreover, the above-described initializing processing for software modules is not sufficiently distributed. In conventional OSs, the processing required for initializing the individual software modules is wholly performed by a program for initializing the OS. That is, processing, such as assigning memory and generating a structure, is executed in the initializing program, as shown in FIG. 15. It is thus difficult to flexibly perform initialization for each software module.

Additionally, both types of processes, such as a process used only when the OS is initialized, for example, a process for the initialization of hardware, and a process continued to be used even after the OS has been initialized, for example, a process for the initialization of application programs, are present in the same initializing program. Thus, the initializing program cannot be deleted even after the initializing processing is completed. Accordingly, the process used only when the OS is initialized is still present in a memory space even after the OS has been started, thereby hampering the efficient use of the memory space.

As stated above, according to the conventional OS initializing process, the memory space cannot be efficiently utilized, and initialization for software modules cannot be flexibly performed when the system is initialized. Thus, even if a process similar to the aforementioned initializing process is applied to a pure object-oriented OS, the characteristics of the pure object-oriented OS cannot be adequately exhibited.

SUMMARY OF THE INVENTION

Accordingly, it is an object of the present invention to provide an information processing apparatus, a program initializing method, and a program providing medium, all of which are suitable for the characteristics of a pure object-oriented OS, by the efficient use of a memory space and by the execution of flexible initializing processing.

In order to achieve the above object, according to one aspect of the present invention, there is provided an information processing apparatus including an OS which has at least one program execution environment and which makes a plurality of objects executable in each of the program execution environments. The information processing apparatus includes a core execution environment and an initial execution environment. The core execution environment provides a function of initializing the plurality of objects on the OS. The initial execution environment executes an OS initializing object by providing a basic processing function of an object-oriented system on the OS. The initial execution environment is deleted after execution processing is migrated to the core execution environment. The OS initializing object creates and initializes the core execution environment based on a boot information structure and is migrated to the core execution environment before the initial execution environment is deleted.

With this arrangement, the initial execution environment for executing the OS initializing object is deleted after the OS has been initialized and after the execution processing has been migrated to the core execution environment. Thus, the OS can be initialized by effectively utilizing the memory space. The OS initializing object creates and initializes the core execution environment based on the boot information structure, thereby making it possible to flexibly initialize the OS.

According to another aspect of the present invention, there is provided a program initializing method for an OS which includes at least one program execution environment and which makes a plurality of objects executable in each of the program execution environments. The program initializing method includes an initial execution environment creating step, a core execution environment initializing step, an object migrating step, and an initial execution environment deleting step. In the initial execution environment creating step, an initial execution environment for providing a basic processing function of an object-oriented system is created on the OS. In the core execution environment initializing step, an OS initializing object is executed in the initial execution environment and, a core execution environment is created based on a boot information structure. Objects forming the core execution environment are created and initialized in the initial execution environment. In the object migrating step, the OS initializing object and the objects forming the core execution environment are migrated to the core execution environment. In the initial execution environment deleting step, the initial execution environment is deleted.

With this arrangement, the initial execution environment for executing the OS initializing object is deleted after the OS initializing object and the objects providing the core execution environment have been migrated to the core execution environment. Thus, the OS can be initialized by effectively utilizing the memory space. The OS initializing object creates and initializes the core execution environment based on the boot information structure, thereby making it possible to flexibly initialize the OS.

According to a further aspect of the present invention, there is provided a program providing medium for providing a data processing program of an OS. The OS includes at least one program execution environment and makes a plurality of objects executable in each of the program execution environments. The data processing program includes an initial execution environment creating step, a core execution environment initializing step, an object migrating step, and an initial execution environment deleting step. In the initial execution environment creating step, an initial execution environment for providing a basic processing function of an object-oriented system is created on the OS. In the core execution environment initializing step, an OS initializing object is executed in the initial execution environment and, a core execution environment is created based on a boot information structure. Objects forming the core execution environment are created and initialized in the initial execution environment. In the object migrating step, the OS initializing object and the objects forming the core execution environment are migrated to the core execution environment. In the initial execution environment deleting step, the initial execution environment is deleted.

BRIEF DESCRIPTION OF THE DRAWINGS

FIG. 10 illustrates an execution environment identification structure used in the OS initializing process shown in FIG. 7;

FIG. 16 illustrates an object-oriented OS.

DESCRIPTION OF THE PREFERRED EMBODIMENTS

An embodiment of the present invention is described in detail below with reference to the drawings.

1. Hardware Configuration

Figure 1:
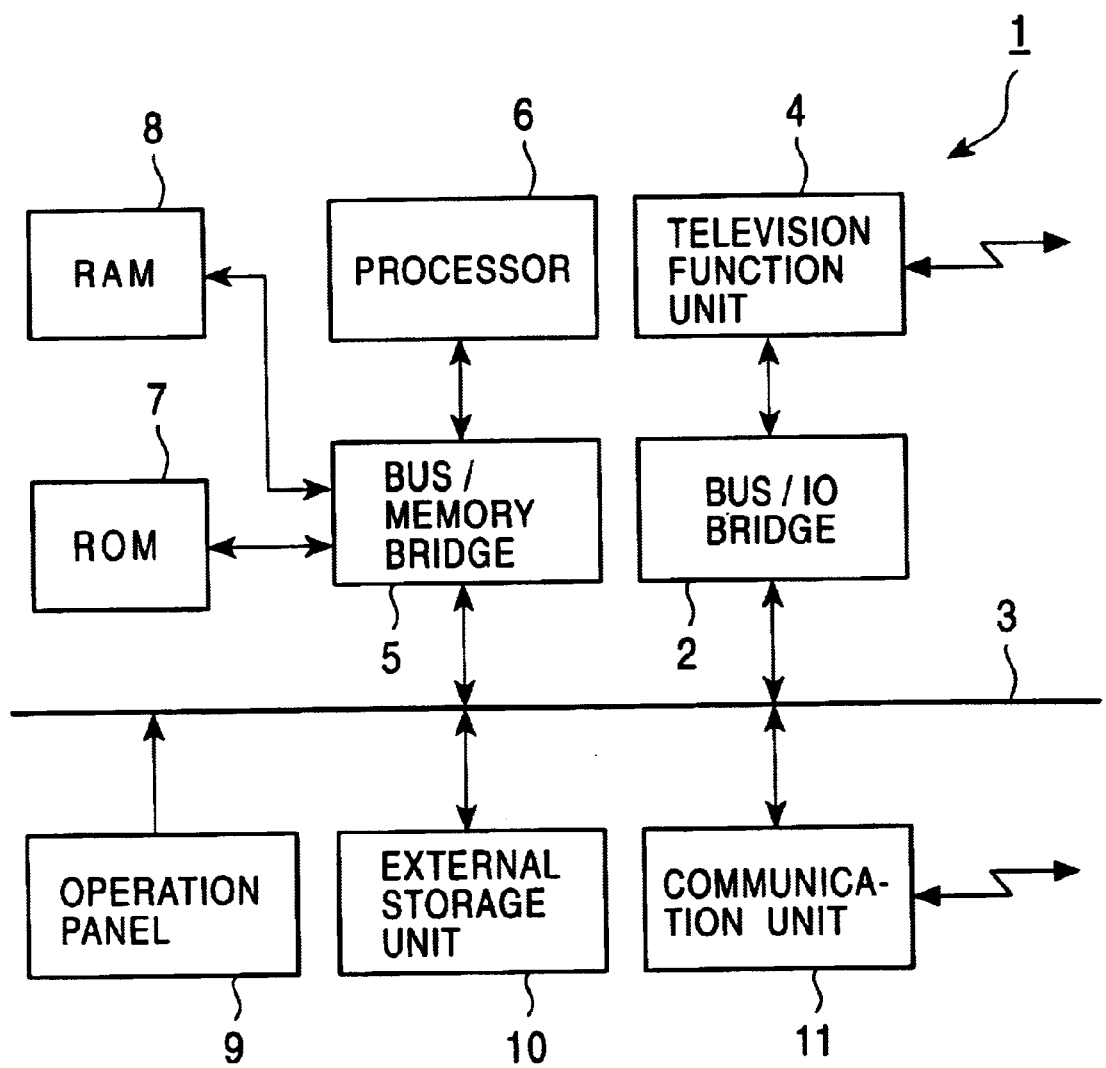
FIG. 1 is a block diagram schematically illustrating a television receiver incorporating an information processing apparatus of the present invention.

A description is first given of an example of the hardware configuration incorporating the present invention with reference to FIG. 1. A television receiver 1 shown in FIG. 1 is merely an example of hardware incorporating the present invention, and the present invention may be used in various types of information processing apparatuses. More specifically, the present invention finds widespread use in information processing apparatuses loaded with an OS, such as various types of audio visual machines (AV machines), office information processing machines, computers, etc.

The television receiver 1 receives signals transmitted from broadcast stations via an antenna or a cable, and displays images on a display unit and outputs sound from a speaker based on the received signal.

The television receiver 1 receives not only television signals, but also programs, data, etc. from an external source. Thus, the television receiver 1 includes, as shown in FIG. 1, a television function unit 4 connected to a bus 3 via a bus/input-output (IO) bridge 2, a processor 6 connected to the bus 3 via a bus/memory bridge 5, a read only memory (ROM) 7 and a random access memory (RAM) 8 connected to the bus 3 via the bus/memory bridge 5, an operation panel 9, an external storage unit 10, and a communication unit 11, which are directly connected to the bus 3.

The television function unit 4 reproduces images and sound based on a signal received via an antenna or a cable. The television function unit 4 is connected to the bus 3 via the bus/IO bridge 2 so that it can transmit and receive signals with the other elements of the television receiver 1.

The processor 6, which controls the individual elements of the television receiver 1, is connected to the bus 3 via the bus/memory bridge 5. Also connected to the processor 6 via the bus/memory bridge 5 are the ROM 7 and the RAM 8. The ROM 7 stores, for example, invariable information of the television receiver 1, such as a manufacturing number and various control information. The RAM 8 provides a memory space used as a work area for the processor 6. That is, the processor 6 controls the individual elements of the television receiver 1 by running an OS or an application program recorded in the external storage unit 10 while using the RAM 8 as a work area. This is discussed in detail below.

The external storage unit 10 is formed of, for example, a hard disk drive, and stores an OS and application programs, which are used for control performed by the processor 6. The external storage unit 10 also stores image data, control data, and programs which are externally downloaded via the communication unit 11. The communication unit 11 also serves as an input/output unit for performing data communications with external sources, and is formed of, for example, a modem, a terminal adapter, etc.

As discussed above, the television receiver 1 receives not only ordinary television signals by using the television function unit 4, but also programs and data from external sources via the communication unit 11. For example, in the television receiver 1, the OS can be upgraded.

The television receiver 1 starts the OS stored in the external storage unit 10 by using the processor 6, and then runs an application program on the OS stored in the external storage unit 10 by using the control information recorded on the ROM 7, thereby controlling the individual elements. That is, the television receiver 1 is provided with the external storage unit 10 as a program providing medium for providing various data processing programs of the OS.

The OS may be recorded in the ROM 7 or the RAM 8, in which case, the ROM 7 or the RAM 8 serves as a program providing medium. However, the OS is desirably stored in a rewritable recording medium so that it can be overwritten, for example, when upgraded. The program providing medium may be a magnetic recording medium, an optical recording medium, etc., which is loaded in and unloaded from the television receiver 1, or may be a network circuit for connecting the television receiver 1 to another information processing apparatus.

The OS loaded in the television receiver 1 is a pure object-oriented OS. Then, on this OS, application programs, such as a program for displaying moving pictures by using the television function unit 4 and a program which implements a graphical user interface (GUI) for controlling the operation panel 9, are executed.

2. Software Configuration

A discussion is now given of an OS incorporating the present invention and loaded in the television receiver 1 shown in FIG. 1.

2.1 Basic Configuration of OS

Figure 2:
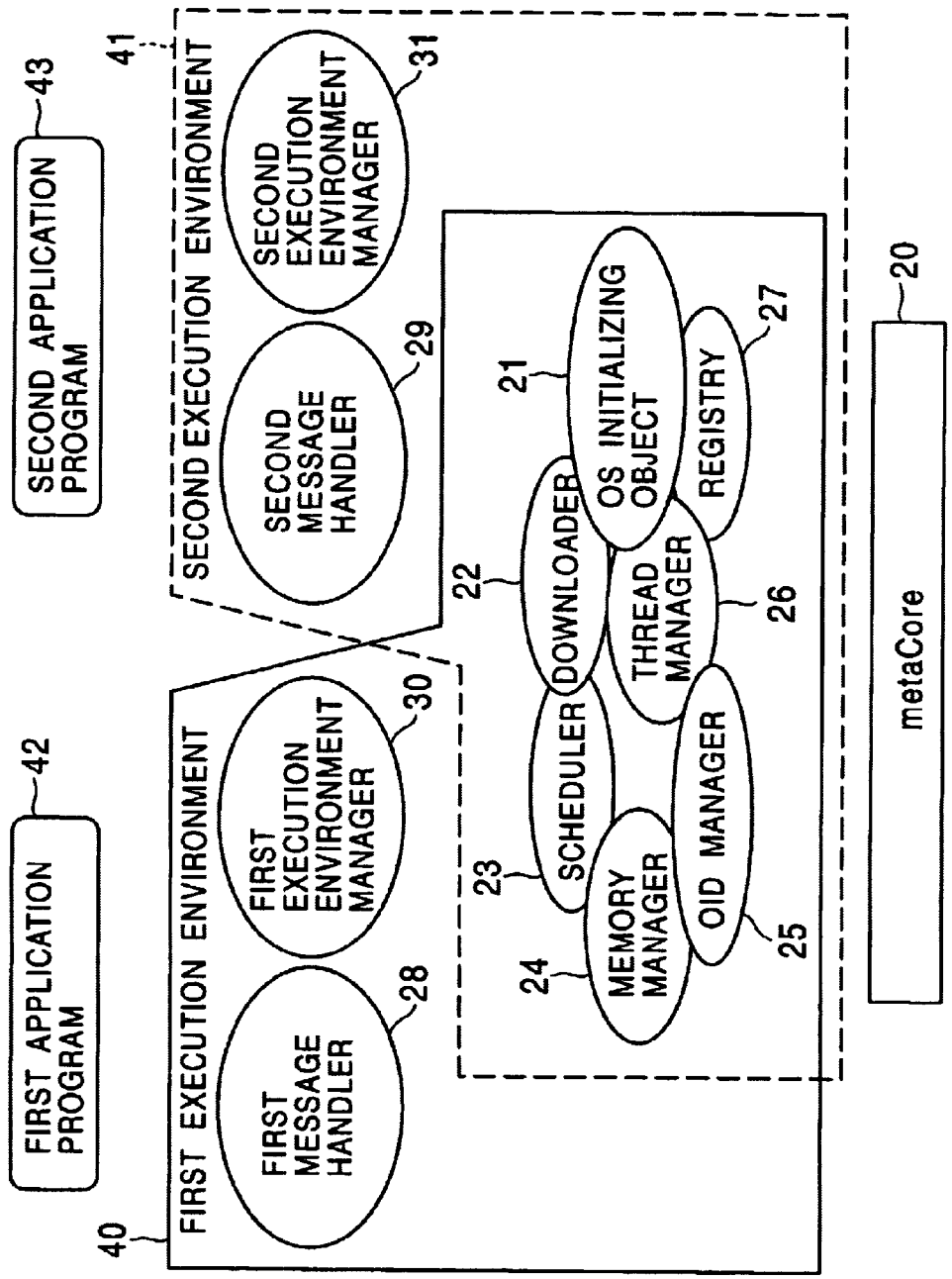
FIG. 2 schematically illustrates an OS of the present invention.

The OS is formed of, as shown in FIG. 2, a metaCore 20, which is the basic part of the OS, and other objects. The metacore 20 is a portion which cannot be defined as an object, and includes a processing mechanisms for switching execution controls between objects, i.e., a thread switching processing mechanism for switching execution threads.

The metaCore 20 is a portion which is difficult to modify by a user program. The objects other than the metacore 20 are easily modified by a user program. The term "modify" used in this embodiment is a modification of the OS, which requires that all the application programs are closed, and then, the OS is restarted.

The OS shown in FIG. 2 is an object-oriented OS, whose objects possess an execution mechanism similar to that of objects forming an application program running on the OS. Thus, the switching operations of execution threads between objects can be grouped into two types in terms of requesting and providing services: (1) shifting execution control from a service requestor to a service provider; and (2) returning execution control from a service provider to a service requestor.

An object of the service requestor who requests services provided by the OS is referred to as a "base-level object". In contrast, an object of the service provider who provides services provided by the OS is referred to as a "metaObject". The relationships between the service requestor and the service provider are referred to as "base/meta relationships". In this case, all the operations within the OS can be represented by base/meta relationships.

In this OS, the thread switching processing mechanism for performing the above two types of switching operations of the execution threads is provided as the metaCore 20. In other words, in this OS, the essential mechanism for constructing the OS is provided by the metaCore 20. More specifically, the metacore 20 assumes a role in switching execution threads, which operation is accompanied by the overwriting of the information concerning the execution threads, and the metaCore 20 is operated as the thread switching processing mechanism. The objects forming the OS can be updated without the need for changing the content of the metaCore 20.

By using this OS, it is possible to implement a highly flexible system with a very small invariable part. In this system, various hardware environments and user demands can be satisfied, for example, a portion assigned to the execution of object interaction (messages exchange between objects) can be debugged, and new functions can be easily added in response to an addition of a new device. Additionally, the portion dependent on the architecture of the processor 6 (hardware-dependent portion) is concentrated in the metacore 20, thereby enhancing the portability of the elements forming the OS between different systems.

2.2 Overall Configuration of OS

In FIG. 2, the objects other than the metaCore 20 include an OS initializing object 21, a downloader 22, a scheduler 23, a memory manager 24, an object identifier (OID) manager 25, a thread manager 26, a registry 27, a first message handler 28, a second message handler 29, a first execution environment manager 30, and a second execution environment manager 31. The OS initializing object 21, the downloader 22, the scheduler 23, the memory manager 24, the OID manager 25, the thread manager 26, the registry 27, the first message handler 28, and the first execution environment manager 30 form a first execution environment 40. The OS initializing object 21, the downloader 22, the scheduler 23, the memory manager 24, the OID manager 25, the thread manager 26, the registry 27, the second message handler 29, and the second execution environment manager 31 form a second execution environment 41. In FIG. 2, a first application program 42 is run on the first execution environment 40, while a second application program 43 is run on the second execution environment 41.

The downloader 22 downloads and unloads (deletes) the individual objects. The scheduler 23 makes schedules for the objects. The memory manager 24 assigns memory shared by all the objects and frees the memory. The OID manager 25 manages the creation and the deletion of the OIDs. The thread manager 26 manages the creation and the deletion of execution threads. The registry 27 performs mapping of the OIDs and the object names of the individual objects.

The first message handler 28 and the second message handler 29 are used for sending and receiving messages by the first execution environment 40 and the second execution environment 41, respectively. The first execution environment manager 30 and the second execution environment manager 31 initialize software objects dependent on the first execution environment 40 and the second execution environment 41, respectively, and also perform data management.

In FIG. 2, two execution environments, such as the first execution environment 40 and the second execution environment 41, are shown. However, the number of execution environments is not a limitation to implement the present invention.

3. Boot Information Structure Used in OS Initializing Process

In the present invention, the above-described OS is initialized by executing the OS initializing object 21. In this case, by referring to a boot information structure shown in FIG. 3, the OS initializing object 21 obtains information of an execution environment to be constructed and information of an object belonging to the corresponding execution environment. The boot information structure is as follows.

Figure 3:
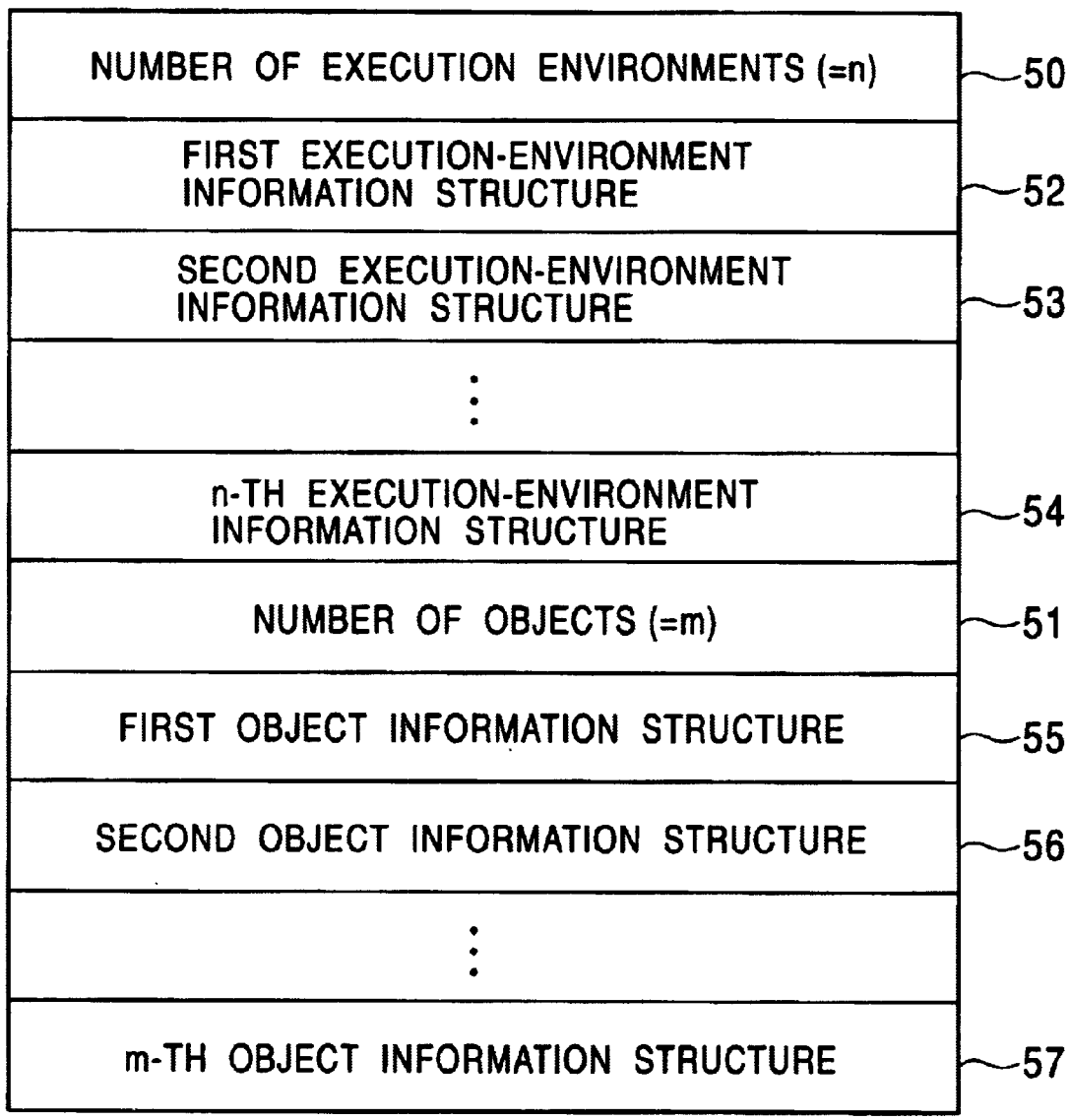
FIG. 3 illustrates a boot information structure used when the OS shown in FIG. 2 is initialized.

The boot information structure may be formed of, as shown in FIG. 3, the number of execution environments 50 to be constructed on a target host, a plurality of execution-environment information structures, the number of objects 51 to be created on the target host, and a plurality of object information structures. According to the boot information structure, the same number of execution-environment information structures as that of execution environments to be constructed on the target host are provided, and the same number of object information structures as that of objects to be created are provided. That is, in the boot information structure, the execution-environment information structures and the execution environments are in one-to-one correspondence, and the object information structures and the objects are in one-to-one correspondence.

In the example shown in FIG. 3, n number of execution-environment information structures, such as a first execution-environment information structure 52, a second execution-environment information structure 53, etc., and an n-th execution-environment information structure 54, are provided. In this case, the number of execution environments 50 is indicated by n. In the example shown in FIG. 3, m number of object information structures, such as a first object information structure 55, a second object information structure 56, etc., and an m-th object information structure 57, are provided. In this case, the number of objects 51 is indicated by m.

In initializing the OS, the boot information structure is read into the target host together with a binary image of the individual objects. The target host is an environment that constructs the OS. The boot information structure is read into memory (ROM 7 or RAM 8) via the communication unit 11 or the external storage unit 10, or may be directly read into the external storage unit 10.

The boot information structure is a structure including both information about the execution environments and information about the objects. This enables the OS initializing object 21 to obtain both items of information when the OS is initialized.

Figure 4:
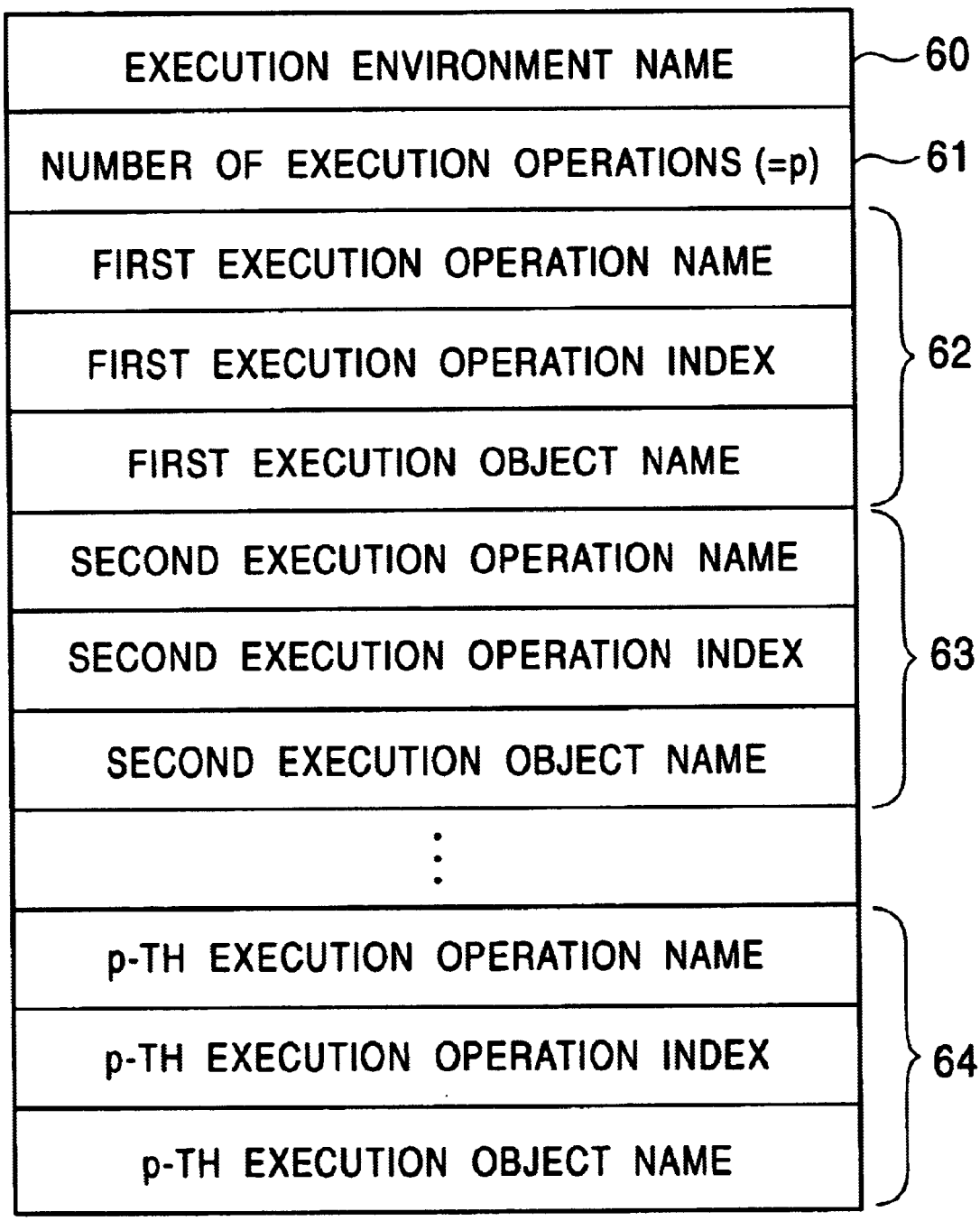
FIG. 4 illustrates an execution-environment information structure of the boot information structure shown in FIG. 3.

Each of the execution-environment information structures 52 through 54 may sequentially include, as illustrated in FIG. 4, an execution environment name 60 for identifying the corresponding execution environment, the number of execution operations 61 indicating the number of operations of the services of the OS supported by the execution environment, and a plurality of items of execution operation information. In the example shown in FIG. 4, p number of items of execution operation information, such as first execution operation information 62, second execution operation information 63, etc., and p-th execution operation information 64, are provided. In this case, the number of execution operations 61 is indicated by p. That is, the execution-environment information structure has the same number of items of execution operation information as that of operations supported by the execution environment.

Each of the items of execution operation information 62 through 64 contains an execution operation name, an execution operation index, and an execution object name. The execution operation name indicates the name of each execution operation. The execution operation index represents the index used for identifying each execution operation. The execution object name indicates which object is used for providing an execution operation corresponding to each service of the OS.

As stated above, the execution-environment information structure is referred to when the OS initializing object 21 initializes the corresponding execution environment. The number of execution-environment information structures provided for the boot information structure is the same as that of execution environments to be created. In initializing the OS, the OS initializing object 21 identifies an execution environment to be initialized based on the execution environment name 60 of each execution-environment information structure, and checks for errors in installing each object in the corresponding execution environment. In initializing the OS, the execution operation name contained in each execution environment structure is reported to the execution environment manager of each execution environment. This enables the execution environment manager to identify the operations to be executable on each execution environment.

Figure 5:
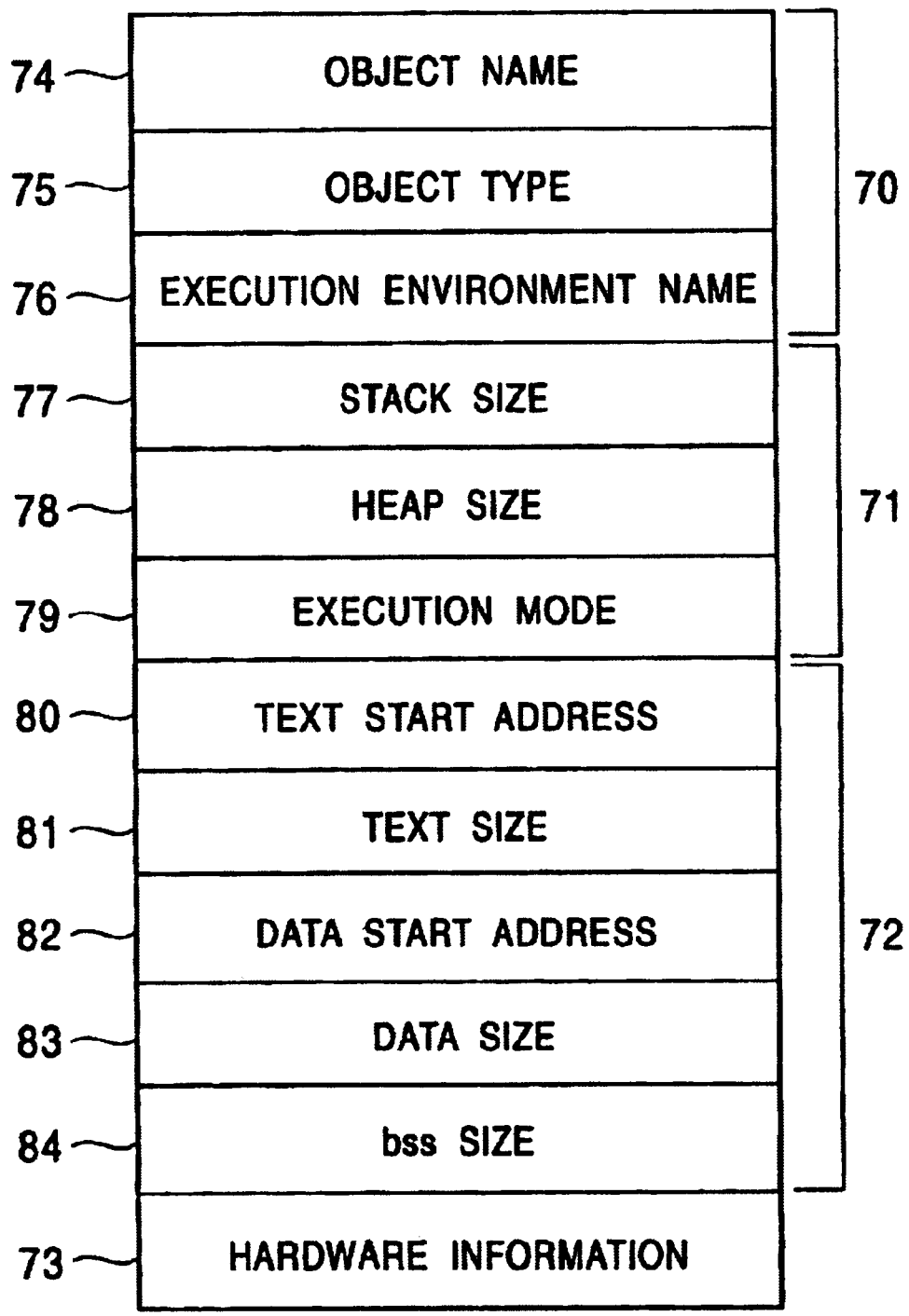
FIG. 5 illustrates an object information structure of the boot information structure shown in FIG. 3.

Each of the object information structures 55 through 57 is formed of, as shown in FIG. 5, basic information 70 required for identifying and installing the objects, execution information 71 concerning calculation resources required for executing the objects, layout information 72 of a memory area in which binary images of the objects are stored, and hardware information 73 dependent on hardware of the target host.

The basic information 70 includes an object name 74, an object type 75, and an execution environment name 76. The object name 74 indicates the name of the corresponding object. The object type 75 represents the type of object, and is indicated by for example, an integer corresponding to the type of object. As the object type 75, an object which operates as an execution object, and an object which is referred to by another object as a dynamic link library may be considered. The execution environment name 76 designates the name of the execution environment which creates the corresponding object. The execution environment name 76 corresponds to the execution environment name 60 contained in the environment information structure. If the execution environment name 76 does not correspond to any of the execution environment names 60 of the environment information structures provided for the boot information structure, the OS initializing process is terminated as an error.

In the object information structure, the provision of the basic information 70 enables the OS initializing object 21 to identify the execution environment in which the corresponding object is to be installed. Then, the OS initializing object 21 is able to inform the objects forming the corresponding execution environment that a new object is to be installed.

The execution information 71 is formed of a stack size 77, a heap size 78, and an execution mode 79. The stack size 77 indicates the memory size of the execution stack of the object. The heap size 78 designates the size of the heap memory used for the object. The execution mode 79 indicates the execution mode of the object. The execution mode may be a kernel mode, which is assigned to part of the objects forming the OS and is allowed to use privileged instructions. Alternatively, the execution mode may be a user mode assigned to an ordinary application object.

In the object information structure, the provision of the execution information 71 enables the OS initializing object 21 to identify calculation resources used by each object. Accordingly, the OS initializing object 21 is able to efficiently initialize the calculation resources. The execution information 71 is reported to the objects which manage the calculation resources of each execution environment, such as the above-described memory manager 24 and the thread manager 26, during the OS initializing process.

The layout information 72 includes a text start address 80, a text size 81, a data start address 82, a data size 83, and a bss size 84. The text start address 80 and the text size 81 respectively represent the start address and the size of a text area (code area) of each object. The data start address 82 and the data size 83 respectively indicate the start address and the size of a data area of each object. The bss size 84 designates the size of a bss area of each object. In this embodiment, it is assumed that the binary image of each object is formed of a text area, a data area, and a bss area.

The layout information 72 is referred to when the OS initializing object 21 initializes the memory area, which stores the individual objects, or creates an entry table used for executing objects, which stores addresses of execution entries.

The hardware information 73 indicates information dependent on the hardware of the target host, for example, information indicating whether the corresponding object is operated according to whether the CPU of the hardware supports a memory management unit.

4. Initializing Algorithm of OS

A description is given below of the initializing process of the OS according to the present invention. In constructing the OS on the target host, the OS is initialized by executing the OS initializing object 21 including program code which is required to be first executed in constructing the OS.

In order to efficiently utilize the memory space of the target host when the OS is initialized, the following two initializing methods are desirably implemented. In one method, the processing required for initializing the OS is distributed into a plurality of objects forming the OS. In the other method, program code required only for initializing the OS is separated from program code continued to be used even after the OS has been initialized.

To implement the aforementioned initializing methods, it is necessary to perform data exchange between the OS initializing object 21 and the other objects. For efficiently performing data exchange, a typical data exchanging method employed in a pure object-oriented OS, i.e., message passing, is desirably employed. This eliminates the need for defining a specific data exchanging method when the OS is initialized, and the typical data exchanging method can be utilized.

Consequently, it is desirable that the OS initializing processing is basically executed as a method of the object, and message passing is used for performing data exchange with the other objects. However, message passing cannot be employed until the OS is initialized.

Thus, according to the OS initializing process, a boot program that is not defined as an object is first executed. By using this boot program, hardware, the invariable part of the OS, and a mechanism for making essential objects executable are initialized. Then, after calculation resources for making the boot program into an object are initialized, the operation of the OS initializing object 21 is started.

The timing at which the operation of the OS initializing object 21 is started as an object is as follows.

An object requires at least basic resources, such as the OID and the thread, and a basic message passing mechanism for performing data exchange. In order to initialize the other objects, such as application objects, the OS initializing object 21 requires, for example, a dynamic link mechanism, a memory management mechanism, and a registry mechanism for managing symbol names, and objects for implementing the above-described mechanisms must be first initialized.

According to the OS initializing process, the OS initializing object 21 commences operating at an earlier time. This makes it possible to use the program of the OS initializing object 21 which is required even after the OS has been initialized. Accordingly, the memory space occupied by the OS initializing object 21 can be reduced. It is thus desirable that the OS initializing object 21 starts operating before the mechanisms for initializing the other objects are implemented. More specifically, the operation of the OS initializing object 21 is best started when only the essential mechanisms are implemented.

It is thus necessary to progressively prepare the execution environments which operate the OS initializing object 21. More specifically, before the mechanisms for initializing the other objects, such as application objects, are operable, the operation of the OS initializing object 21 is started. Then, when the above-mentioned mechanisms have become operable, the other objects are initialized by utilizing such mechanisms.

In the present invention, by utilizing the characteristics in which a plurality of execution environments are easily provided by an object-oriented OS, an execution environment that provides only a required mechanism (hereinafter referred to as an "initial execution environment") is initially prepared, and then, the OS initializing object 21 is executed in this initial execution environment. Subsequently, an execution environment that provides all the mechanisms required for initializing the other objects, such as application objects, (hereinafter referred to as a "core execution environment") is prepared. The OS initializing object 21 is shifted from the initial execution environment to the core execution environment.

In the following description, relating an object to the execution environment and making the object operable in the execution environment is referred to as "installing" the object in the execution environment. Shifting of the object between execution environments is referred to as "object migration", and to shift the object between execution environments is referred to as "migrate".

The relationship between the object and the execution environment is indicated by an execution environment identification (ID) structure, which is possessed by the object so as to identify the corresponding execution environment. Details of the execution environment ID structure are discussed below. In installing the object in the execution environment, information for identifying the corresponding execution environment is written into the execution environment ID structure of the object. When the object is migrated, the execution environment ID structure is substituted with that corresponding to the execution environment to which the object is migrated.

Figure 6:
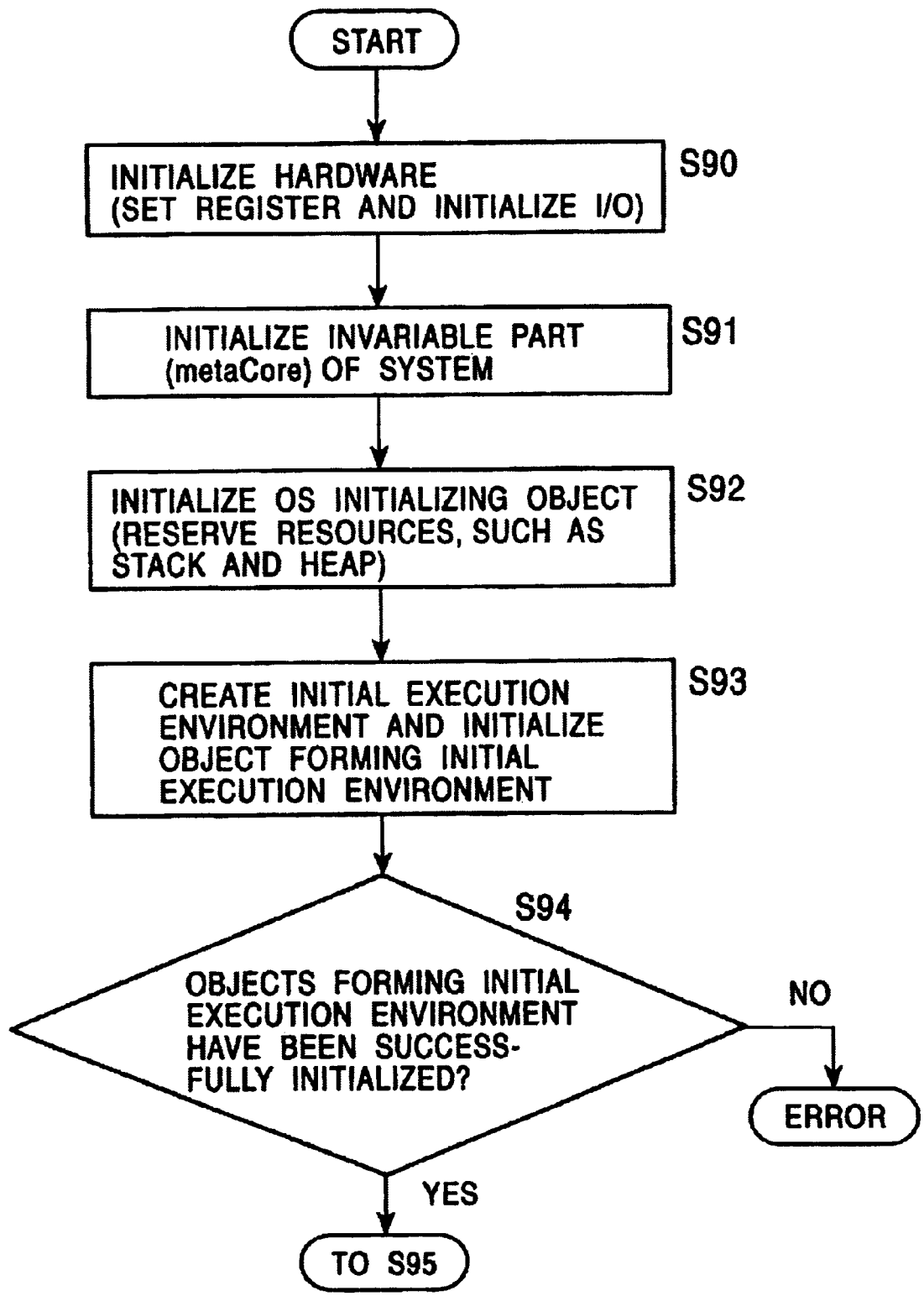
FIGS. 6 and 7 are flow charts illustrating an OS initializing process according to the present invention.
Figure 7:
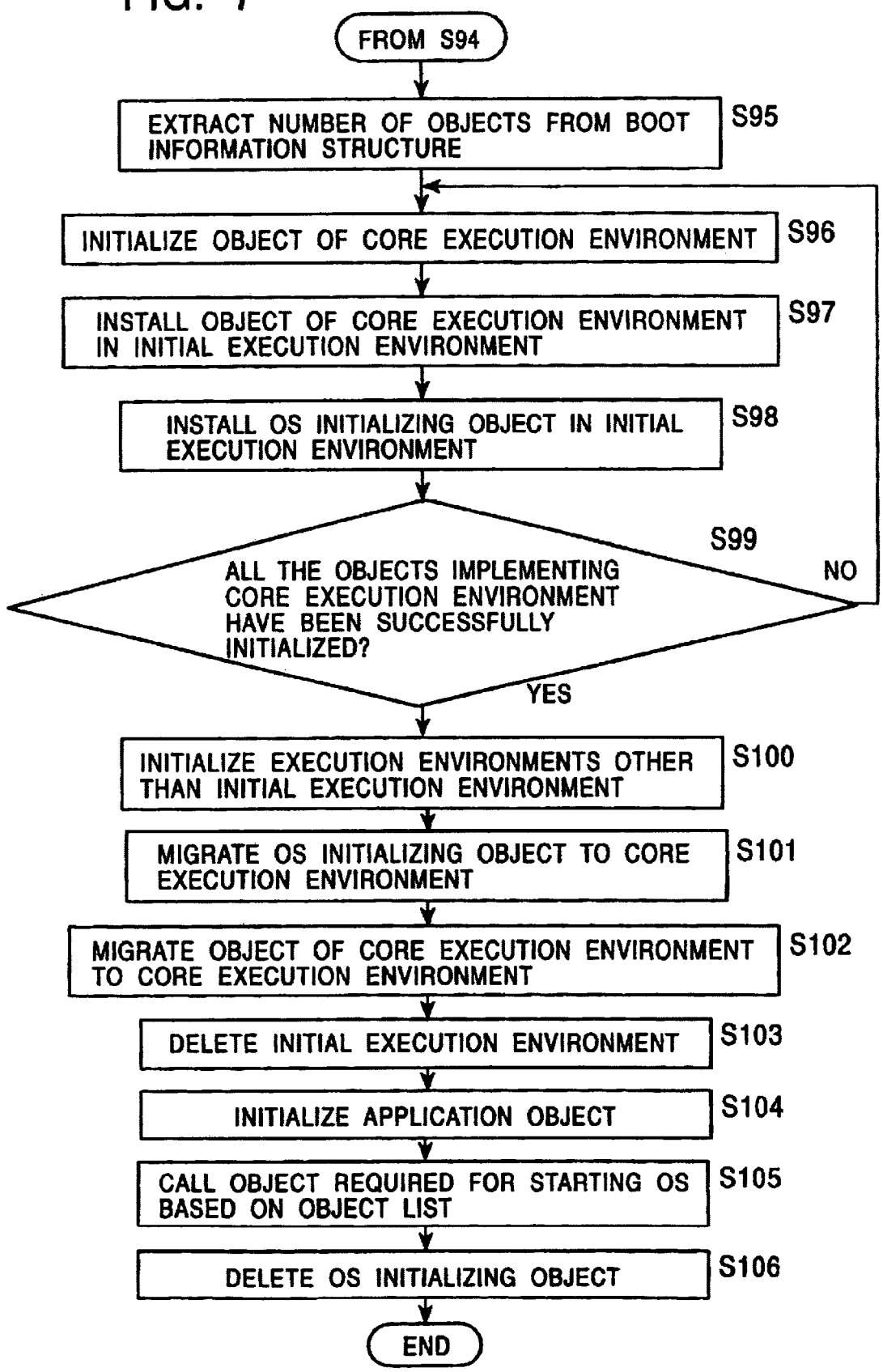

The OS initializing process is described in detail below with reference to FIGS. 6 and 7. FIG. 6 is a flow chart illustrating the process before the OS initializing object 21 starts operating as an object. FIG. 7 is a flow chart illustrating the operation of the OS initializing object 21 as an object. In the following description, it is assumed that a binary image of the object can be downloaded into the target host via a network and that the boot information structure is loaded in the target host.

In initializing the OS, in step S90, the OS initializing object 21 is first loaded into the target host. Then, the OS initializing object 21 initializes hardware, such as registers and input/output devices, of the host target.

Then, in step S91, the OS initializing object 21 initializes the invariable part of the OS, such as the above-described metaCore 20. In step S92, the OS initializing object 21 reserves calculation resources, such as a memory space required for a stack and a heap, and initializes the object 21 itself.

Subsequently, in step S93, the OS initializing object 21 creates the initial execution environment and initializes the object forming this initial execution environment. The processing in step S93 is executed according to a specific method, independent of the content of the boot information structure.

It is then determined in step S94 whether the creation of the initial execution environment and the initialization of all the objects forming this initial execution environment have been successfully performed by the OS initializing object 21. If the outcome of step S94 is no, the OS initializing process is terminated as an error. If the result of step S94 is yes, the OS initializing object 21 begins to operate as an object, and the process proceeds to step S95 shown in FIG. 7.

In step S95, the OS initializing object 21 obtains the total number of objects in initializing the OS by referring to the boot information structure. Then, in step S96, the OS initializing object 21 creates and initializes an object forming the core execution environment. The processing in step S96 is discussed in detail below.

Thereafter, in step S97, the OS initializing object 21 installs the object forming the core execution environment in the initial execution environment. Accordingly, the object forming the core execution environment is related to the initial execution environment.

In step S98, the OS initializing object 21 installs itself in the initial execution environment, so that it is related to the initial execution environment.

Subsequently, in step S99, the OS initializing object 21 determines whether all the objects forming the core execution environment have been successfully initialized. If the outcome of step S99 is no, the process returns to step S96. If the result of step S99 is yes, the process proceeds to step S100.

In step S100, by referring to the boot information structure, the OS initializing object 21 creates and initializes all the execution environments other than the initial execution environment to be constructed on the OS. Details of the processing in step S100 is described in detail below.

Then, in step S101, the OS initializing object 21 migrates itself from the initial execution environment to the core execution environment created in step S100. In step S102, the OS initializing object 21 migrates the objects forming the core execution environment, which were installed in the initial execution environment, to the core execution environment.

Thereafter, in step S103, the OS initializing object 21 deletes the initial execution environment, which is now unnecessary. Accordingly, the memory space of the target host used for the initial execution environment can be freed.

In step S104, by referring to the boot information structure, the OS initializing object 21 creates and initializes application objects. As a result, the objects forming the core execution environment, which are basic elements of the OS, and the application objects forming the applications have been created and initialized. Details of the processing in step S104 are discussed in detail below.

Subsequently, in step S105, the OS initializing object 21 executes an object which is to be first executed when starting the OS, such as an object implementing a server program.

Finally, in step S106, the OS initializing object 21 deletes itself. The processing is then completed.

According to the OS initializing process, as stated above, the OS initializing object 21 is first installed in the initial execution environment and is then migrated to the core execution environment. That is, the OS initializing object 21 initially possesses the execution environment ID structure of the initial execution environment, and later possesses the execution environment ID structure of the core execution environment. Similarly, in the present invention, the objects forming the core execution environment are initially installed in the initial execution environment, and are then migrated to the core execution environment. Thus, when the core execution environment is fully prepared, the initial execution environment, which becomes unnecessary after the OS has been initialized, can be deleted, thereby achieving the efficient use of the memory space of the target host.

Figure 8:
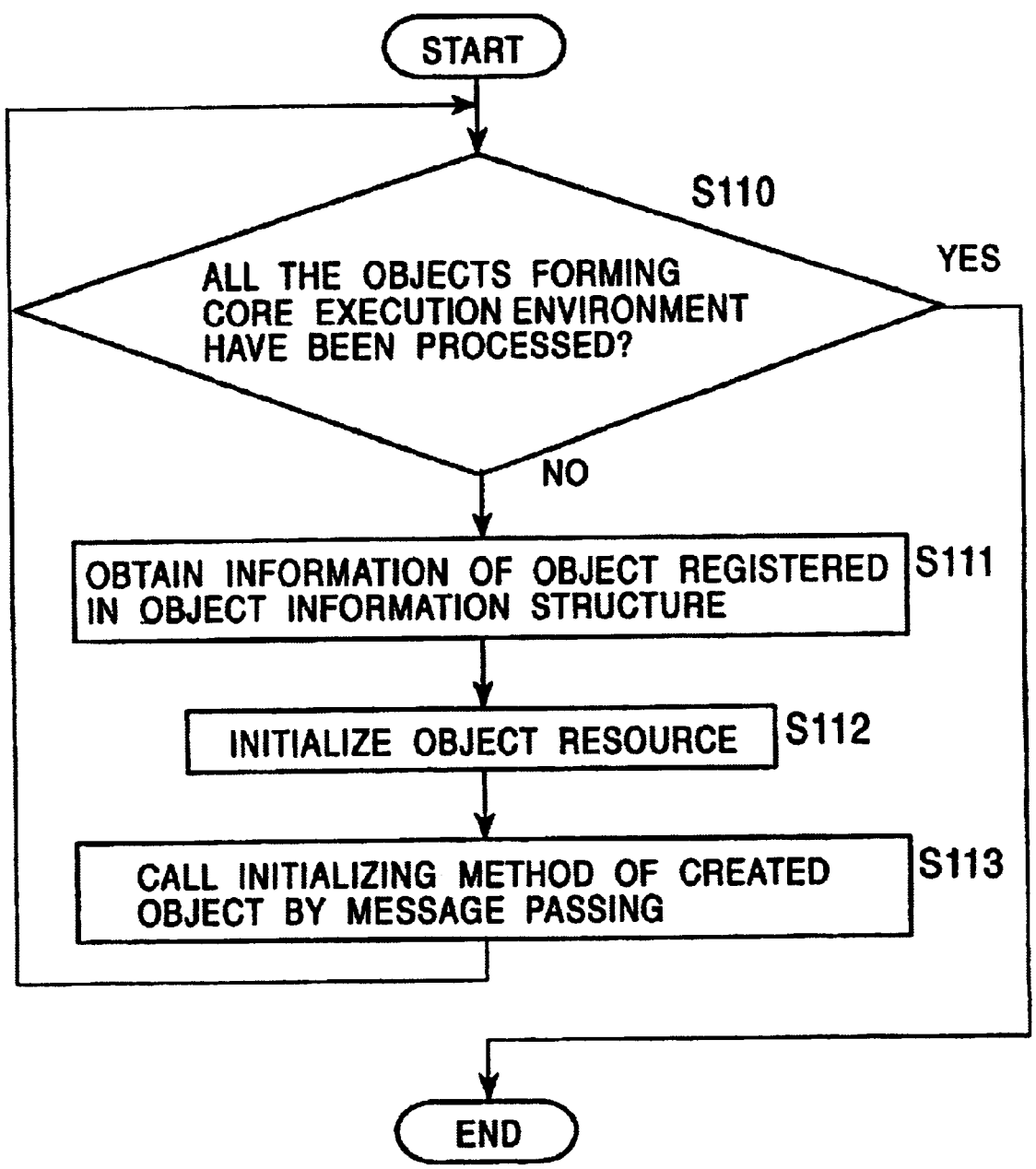
FIG. 8 is a flow chart illustrating details of step S96 of the OS initializing process shown in FIG. 7.

A detailed description is given below of he initialization of the objects forming the core execution environment in step S96 with reference to FIG. 8. At the start of step S96, execution environments other than the initial execution environment have not yet been created or initialized, and thus, normal execution processing dependent on the execution environments cannot be performed. Initializing processing to be executed in the core execution environment by using the execution environment manager object cannot be performed, either. Accordingly, in step S96, the objects forming the core execution environment are initialized in the following manner.

In step S110, the OS initializing object 21 determines by referring to the object information structure of the boot information structure whether all the objects forming the core execution environment have been processed. If the outcome of step S110 is yes, the processing in step S96 is completed, and the process proceeds to step S97. If it is found in step S110 that there is an object to be processed, the process proceeds to step S111.

In step S111, the OS initializing object 21 acquires information of an object which has been registered as an object forming the core execution environment by referring to the object information structure of the boot information structure.

Then, in step S112, the OS initializing object 21 creates the object in the initial execution environment and initializes the object. Simultaneously, the OS initializing object 21 initializes the object resources. Details of the processing in step S112 are stated below.

Subsequently, in step S113, the OS initializing object 21 calls the initializing method of the object created in step S112 according to message passing, and the process returns to step S110.

As discussed above, in step S96, the objects are created without using the execution environment manager object. Accordingly, the presence of an execution environment matching the created object is not checked for.

The processing in step S100 is as follows. In step S100, the execution environments other than the initial execution environment are created, and the names of the created execution environments are registered in an execution environment list provided within the OS initializing object 21. Simultaneously, the execution operations to be processed in the execution environments and the names thereof are registered in the execution environment ID structure. The execution environment ID structure is as follows.

The execution environment ID structure is provided within the OS initializing object 21 and includes, as shown in FIG. 10, an execution operation index 120, an execution object ID 121, and an execution operation entry point 122. The execution operation index 120 corresponds to the execution operation name of the execution-environment information structure of the boot information structure, and stores the ID number of the operation. The execution object ID 121 corresponds to the execution object name of the execution-environment information structure, and stores the ID of each object. The execution operation entry point 122 stores a pointer indicating the entry point of each object.

Figure 9:
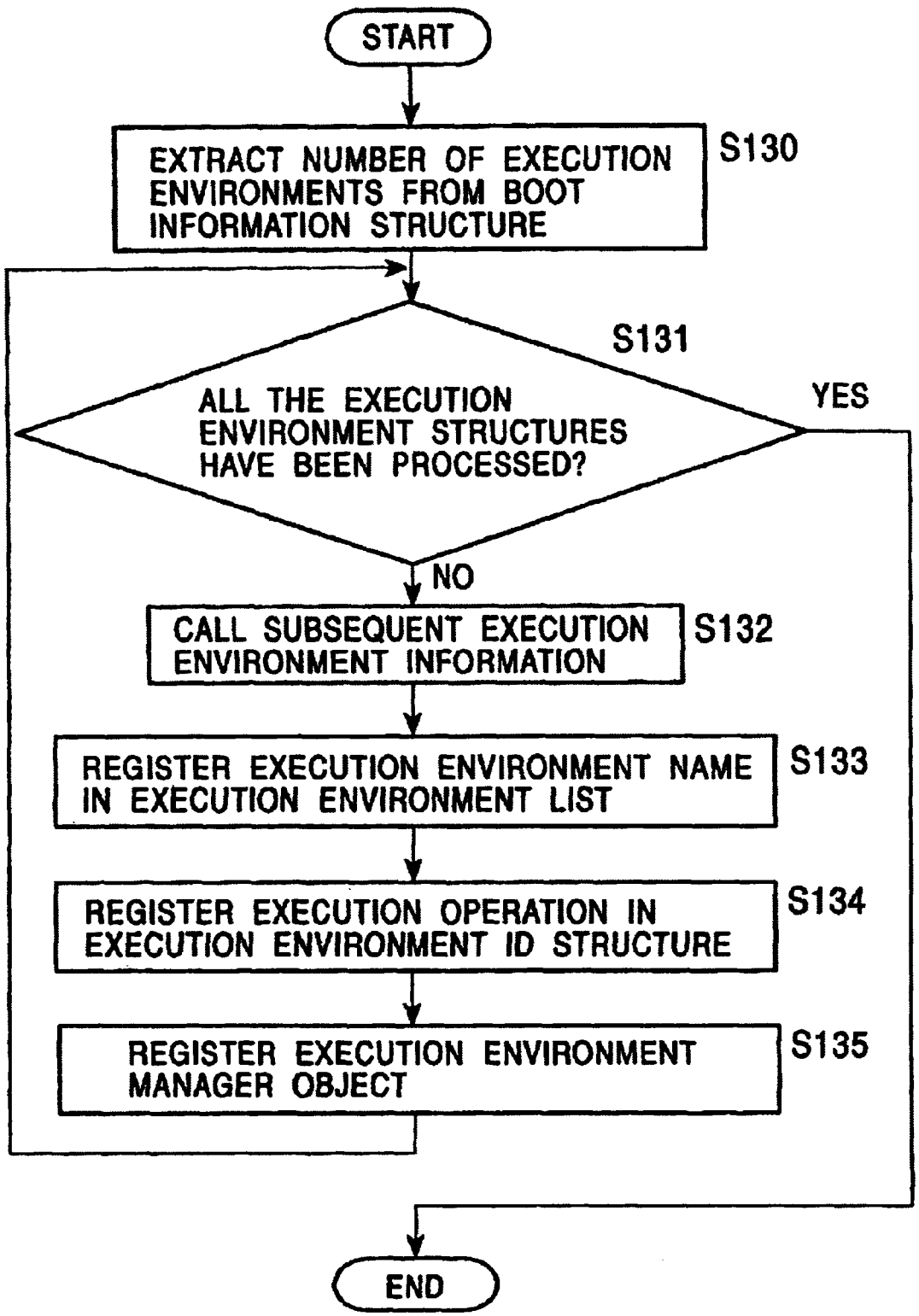
FIG. 9 is a flow chart illustrating details of step S100 of the OS initializing process shown in FIG. 7.

In step S100 of the OS initializing process, the processing shown in FIG. 9 is performed.

In step S130, by referring to the boot information structure, the OS initializing object 21 first acquires the number of execution environments to be created.

Then, in step S131, the OS initializing object 21 determines whether all the execution environment structures provided for the boot information structure have been processed. If the outcome of step S131 is yes, the processing in step S100 is completed, and the process proceeds to step S101. If it is found in step S131 that there is an execution environment structure to be processed, the process proceeds to step S132.

In step S132, the OS initializing object 21 selects an execution environment structure to be processed. Then, in step S133, the execution environment name 60 of the execution environment structure is registered in the execution environment list within the OS initializing object 21.

Thereafter, in step S134, the OS initializing object 21 registers a plurality of execution operations indicated in the execution-environment information structure in the corresponding execution environment ID structures. In this case, the execution operation index of each execution operation is registered in the execution operation index 120 of the execution environment ID structure. The object ID and the entry point of the execution operation are registered in the execution object ID 121 and the execution operation entry point 122, respectively.

Then, in step S135, the OS initializing object 21 registers in the registry 27 the execution environment manager corresponding to the execution environment indicated in the execution-environment information structure. Thus, an initialized execution environment can be identified by the execution environment name by the registry 27. Since the execution environment manager and the registry 27 are system objects forming a core execution environment, they have already been initialized before the start of step S100. After the processing in step S135, the process returns to step S131.

As stated above, in step S100, all the execution environments including the core execution environments are created and initialized. Thus, after step S100, application objects can be initialized by utilizing the mechanisms provided by the individual execution environments.

Figure 11:
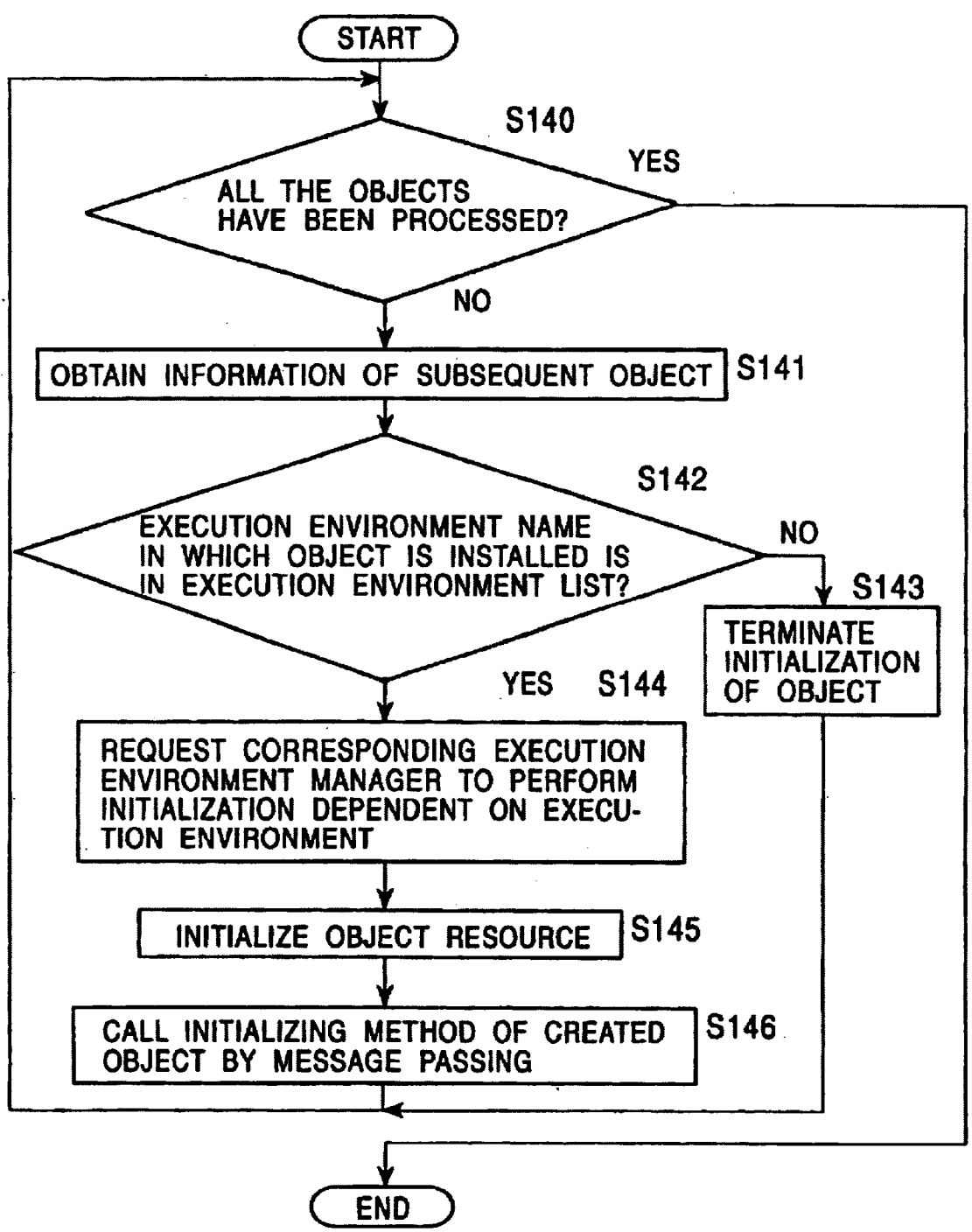
FIG. 11 is a flow chart illustrating details of step S104 of the OS initializing process shown in FIG. 7.

The processing in step S104 is described in detail below with reference to FIG. 11. In step S104, application objects, which have not been created upon completion of the initialization of the core execution environments, are created and initialized. At the start of step S104, the objects forming the core execution environments and all the execution environments have been initialized.

In step S140, the OS initializing object 21 determines whether all the objects have been processed. If the result of step S140 is yes, the processing in step S104 is completed, and the process proceeds to step S105. If it is found in step S140 that there is an object to be processed, the process proceeds to step S141. Information indicating whether the individual objects have been initialized is registered in an internal table provided in the OS initializing object 21, and the internal table is managed by the OS initializing object 21.

Then, in step S141, the OS initializing object 21 obtains information concerning an object to be created and initialized by referring to the object information structure of the boot information structure.

Subsequently, in step S142, the OS initializing object 21 checks for the presence of an execution environment in which the corresponding object is to be installed. This determination is made by searching for the execution environment name 76 contained in the basic information 70 of the object information structure in the execution environment list provided within the OS initializing object 21.

If the result of step S142 is no, the process proceeds to step S143 in which the OS initializing object 21 terminates the initializing processing, and the process returns to step S140.

If it is found in step S142 that there is an execution environment in which the object is to be installed, the process proceeds to step S144. In step S144, the OS initializing object 21 requests the execution environment manager of the execution environment in which the object is to be installed to perform initializing processing dependent on the corresponding execution environment. According to this initializing processing, for example, objects required for performing message passing are registered in the message handler object dependent on the execution environment.

Then, in step S145, the OS initializing object 21 initializes object resources in a manner similar to the above-described processing in step S112. Details of the processing in step S145 are stated below.

Subsequently, in step S146, the OS initializing object 21 calls the initializing method of the created object by using message passing, and the process returns to step S140.

In this manner, in step S104, the application objects are created and initialized. Upon completion of the processing in step S104, all the execution environments have been constructed on the OS, and all the objects have been initialized.

Figure 12:
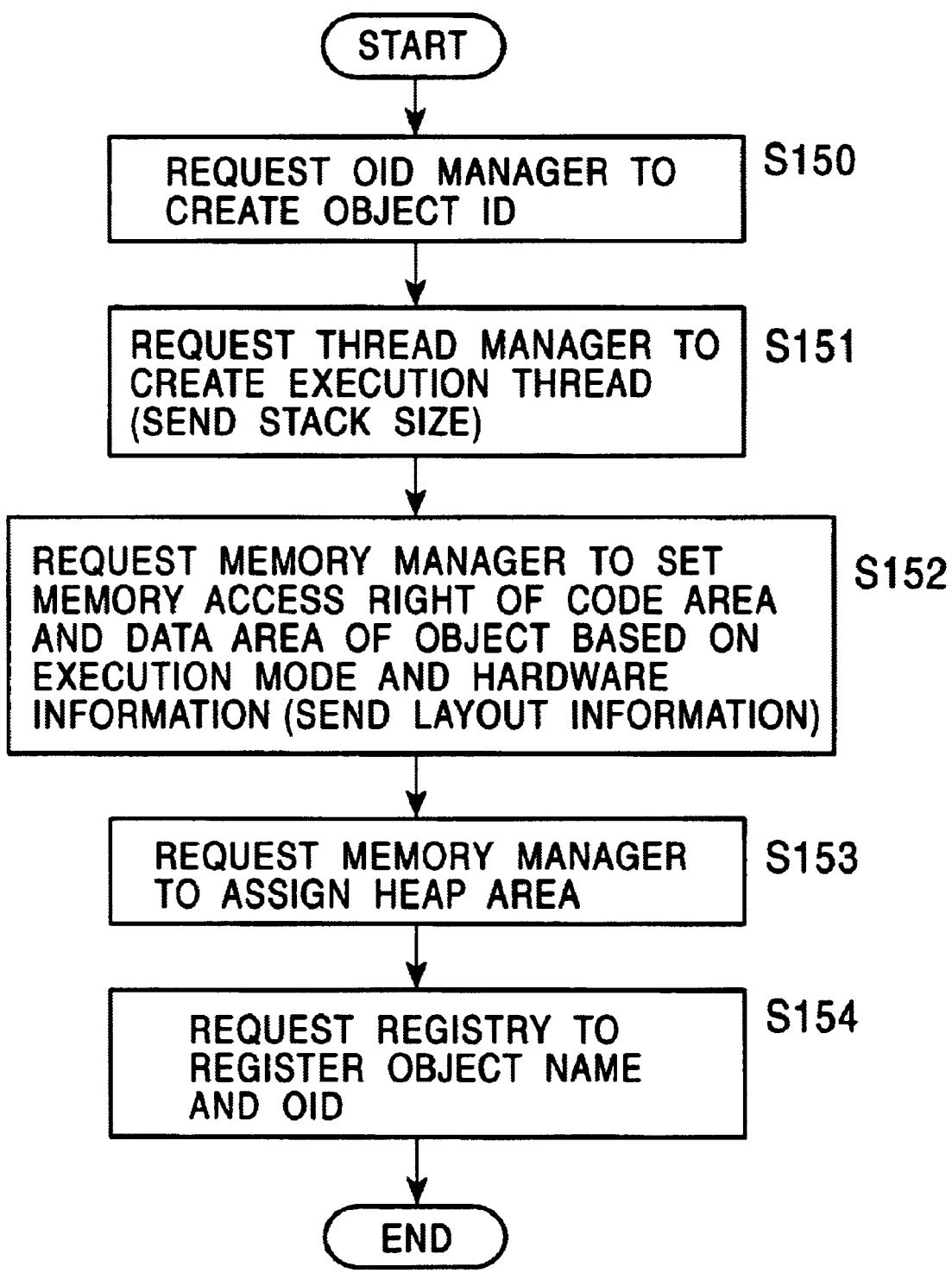
FIG. 12 is a flow chart illustrating details of steps S112 and S145 of the OS initializing process shown in FIGS. 8 and 11, respectively.
Figure 13:
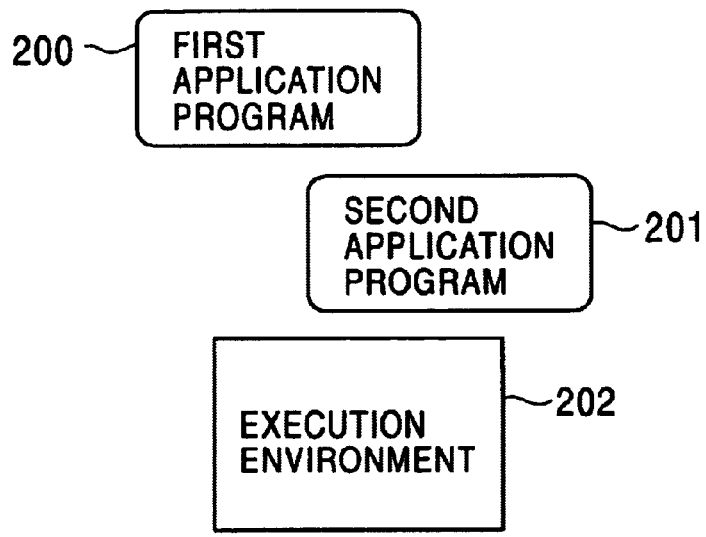
FIG. 13 illustrates a conventional OS provided with a single execution environment.
Figure 14:
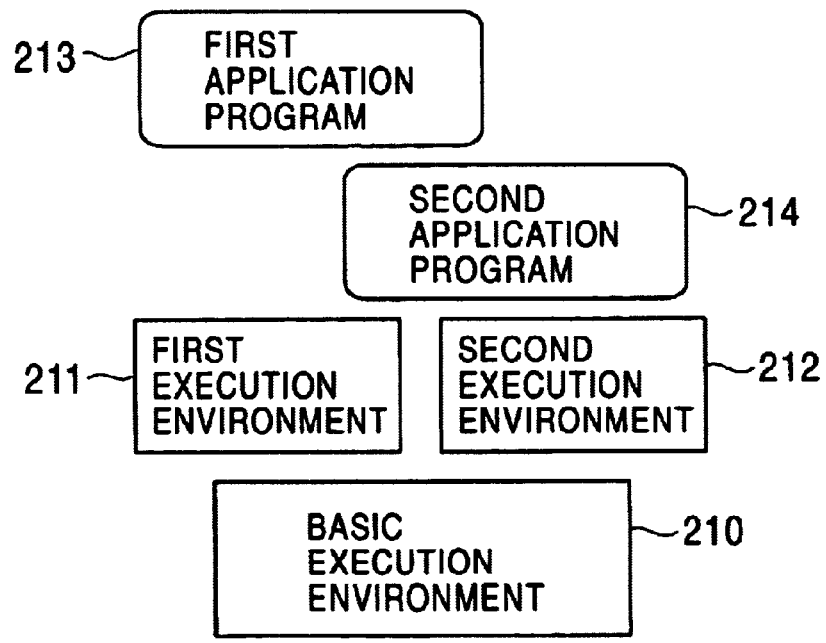
FIG. 14 illustrates a conventional OS provided with a plurality of inflexible execution environments.
Figure 15:
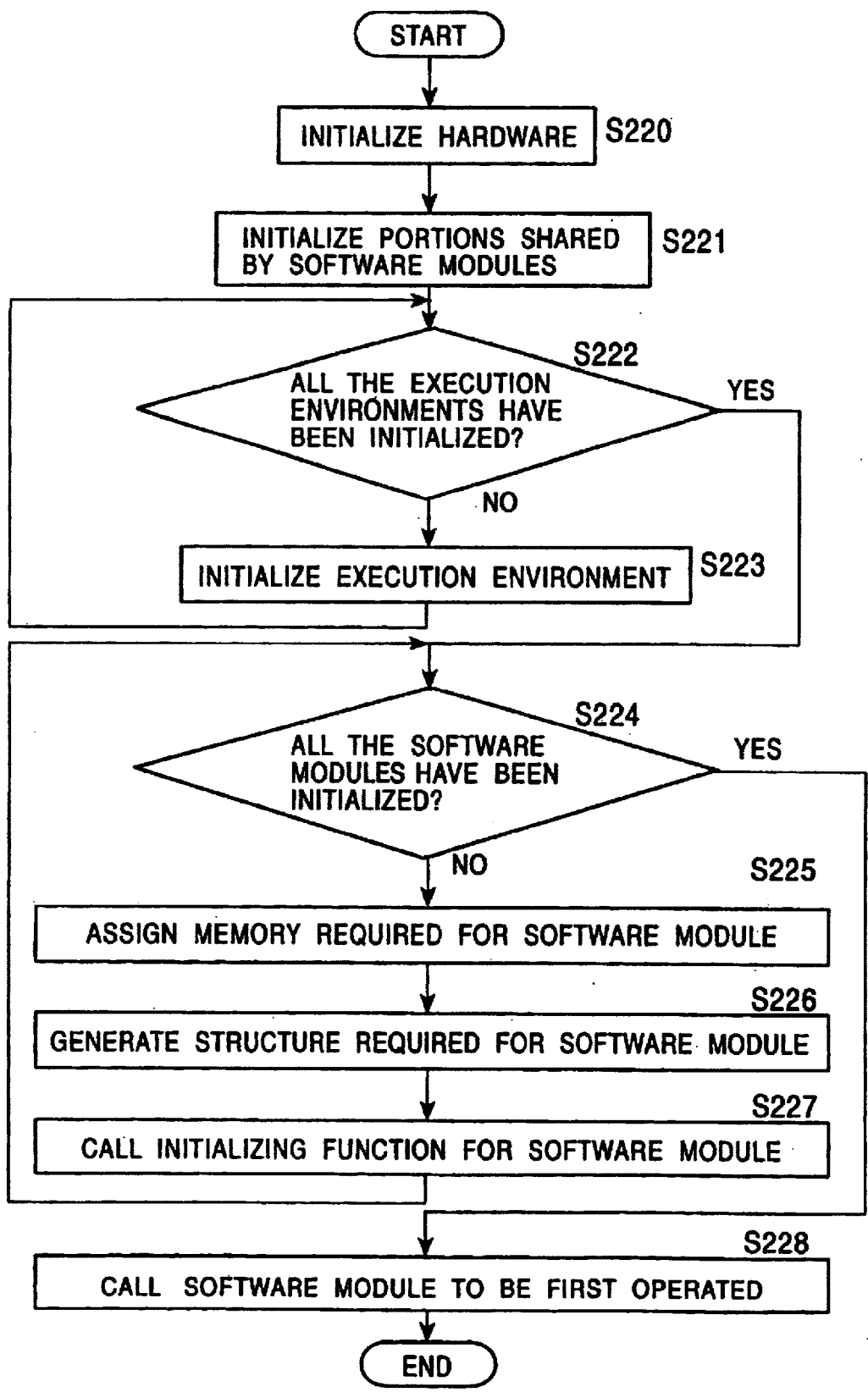
FIG. 15 is a flow chart illustrating a conventional OS initializing process.

Details of the processing in steps S112 and S145 are discussed below with reference to FIG. 12. At the start of the processing in steps S112 and S145, the memory manager 24, the OID manager 25, the thread manager 26, and the registry 27, all of which are system objects, have been initialized.

In step S150, the OS initializing object 21 requests the OID manager 25 to create the object ID.

Then, in step S151, the OS initializing object 21 requests the thread manager 26 to create the execution thread of the object. Simultaneously, the OS initializing object 21 reports the value of the stack size 77 of the object information structure to the thread manager 26 and requests it to manage the stack.

Subsequently, in step S152, the OS initializing object 21 requests the memory manager 24 to set the memory access rights of the text area and the data area of the object based on the execution mode 79 and the hardware information 73, which indicates the memory protection information, of the object information structure. In this case, the OS initializing object 21 may send the execution information 71, the layout information 72, and the hardware information 73 of the object information structure to the memory manager 24.

Then, in step S153, the OS initializing object 21 requests the memory manager 24 to assign the heap area of the object.

Thereafter, in step S154, the OS initializing object 21 requests the registry 27 to register the object name and the object ID. The OS initializing object 21 also stores the ID registered in the registry 27 in the execution object ID 121 of the execution environment ID structure.

As discussed above, in steps S112 and S145, the resources of the individual objects are initialized. The objects are thus initialized and become executable. This enables the other objects to refer to the initialized objects by using the execution operation index of the execution-environment information structure or the execution object ID 121 of the execution environment ID structure.

According to the OS initializing process of the present invention, as described above, in initializing the OS, information concerning an execution environment to be created on the OS is provided by the execution-environment information structure of the boot information structure. This enables the OS initializing object 21 to check for the presence of an execution environment in which each object is to be installed. The OS initializing object 21 is also able to efficiently request the execution environment manager of each execution environment to initialize the objects.

Thus, in the above-described OS initializing process, the initializing processing executed in common for all the execution environments can be unambiguously assigned to the OS initializing object 21. The execution codes that execute the same processing are integrated into the OS initializing object 21, thereby reducing the memory capacity required for the initializing processing. Thus, the OS can be efficiently implemented on the target host.

The program code which is continued to be used even after the OS has been initialized is separated from the OS initializing object 21 for initializing the OS, and is assigned to the memory manager 24, the OID manager 25, the thread manager 26, and the registry 27. Accordingly, the OS initializing object 21 can be deleted upon completion of initializing the OS. As a result, the memory space used by the OS initializing object 21 can be freed and effectively utilized, thereby enhancing the efficient use of the memory space.

Additionally, the OS is initialized by using not only the OS initializing object 21, but also other objects, such as the memory manager 24, the OID manager 25, the thread manager 26, and the registry 27. Thus, the OS can be flexibly initialized according to the needs of the user or improvements and developments in the system. Further, elements used for initializing the OS are formed into modules as objects, thereby making it possible to dynamically and flexibly update and modify the OS without interrupting the operation thereof.

As is seen from the foregoing description, the present invention offers the following advantages. The OS can be flexibly initialized by effectively utilizing the memory space. Accordingly, in executing an object-oriented OS, a plurality of execution environments can be provided with a small memory capacity, and information can be flexibly processed while sufficiently exhibiting the characteristics of the OS. It is also possible to flexibly construct a plurality of execution environments on the object-oriented OS.

What is claimed is:

1. An information processing apparatus comprising an operating system which includes at least one program execution environment and which makes a plurality of objects executable in each of the program execution environments, said information processing apparatus comprising:
   a core execution environment for providing a function of initializing the plurality of objects on said operating system; and
   an initial execution environment for executing an operating-system initializing object by providing a basic processing function of an object-oriented system on said operating system, said initial execution environment being deleted after execution processing is migrated to said core execution environment,
   wherein said operating-system initializing object creates and initializes said core execution environment based on a boot information structure and is migrated to said core execution environment before said initial execution environment is deleted.

2. An information processing apparatus according to claim 1, wherein said boot information structure comprises:
   an execution-environment information structure including
      initializing information concerning at least one execution environment; and an object information structure including initializing information concerning at least one object forming each of the execution environment.

3. An information processing apparatus according to claim 2, wherein said execution-environment information structure comprises: an execution environment name for identifying each of the execution environments; the number of execution operations indicating the number of execution operations of said operating system supporting each of the execution environments; and at least one item of execution operation information indicating a name and an identification index of the execution operation.

4. An information processing apparatus according to claim 2, wherein said object information structure comprises: basic information including information for identifying and setting each of the objects; execution information including information concerning calculation resources for executing each of the objects; layout information including information concerning a memory area in which each of the objects is stored; and hardware information including information dependent on hardware of a target host.

5. An information processing apparatus according to claim 4, wherein said basic information comprises: an object name for identifying each of the objects; an object type for identifying a type of each of the objects; and an execution environment name for identifying an execution environment in which each of the objects is executed.

6. An information processing apparatus according to claim 4, wherein said execution information comprises: a stack size indicating a memory size of an execution stack of each of the objects; a heap size indicating a size of a heap memory used by each of the objects; and an execution mode name indicating an execution mode of each of the objects.

7. An information processing apparatus according to claim 4, wherein said layout information comprises: a text start address indicating a start address of a text area of each of the objects; a text size indicating a size of the text area of each of the objects; a data start address indicating a start address of a data area of each of the objects; a data size indicating a size of the data area of each of the objects; and a bss size indicating a size of a bss area of each of the objects.

8. A program initializing method for an operating system which includes at least one program execution environment and which makes a plurality of objects executable in each of the program execution environments, said program initializing method comprising:
   an initial execution environment creating step of creating an initial execution environment for providing a basic processing function of an object-oriented system on said operating system;
   a core execution environment initializing step of executing an operating-system initializing object in said initial execution environment and creating a core execution environment based on a boot information structure, and of creating and initializing objects forming said core execution environment in said initial execution environment;
   an object migrating step of migrating said operating-system initializing object and the objects forming said core execution environment to said core execution environment; and
   an initial execution environment deleting step of deleting said initial execution environment.

9. A program initializing method according to claim 8, further comprising a program execution environment initializing step of: creating each of the program execution environments based on the boot information structure; registering an execution environment name of each of the program execution environments and an execution operation processed by each of the program execution environments in an execution environment list and an execution environment identification structure, respectively; and creating an execution environment manager object for managing each of the program execution environments, said program execution environment initializing step being performed by said operating-system initializing object.

10. A program initializing method according to claim 9, further comprising a program object initializing step of creating and initializing the plurality of objects forming each of said program execution environments based on said boot information structure, said program object initializing step being performed by said operating-system initializing object after said program execution environment initializing step.

11. A program initializing method according to claim 10, wherein said program object initializing step requests said execution environment manager object corresponding to each of the program execution environments to execute initializing processing dependent on each of the program execution environments.

12. A program initializing method according to claim 8, wherein the plurality of objects are created by incorporating binary images of the objects from a storage system.

13. A program initializing method according to claim 12, wherein said storage system comprises a recording medium on which the binary image is stored and said storage system is connected via a transmission channel.

14. A program providing medium for providing a data processing program of an operating system which includes at least one program execution environment and which makes a plurality of objects executable in each of the program execution environments, said data processing program comprising:

an initial execution environment creating step of creating an initial execution environment for providing a basic processing function of an object-oriented system on said operating system;

a core execution environment initializing step of executing an operating-system initializing object in said initial execution environment and creating a core execution environment based on a boot information structure, and of creating and initializing objects forming said core execution environment in said initial execution environment;

an object migrating step of migrating said operating-system initializing object and the objects forming said core execution environment to said core execution environment; and an initial execution environment deleting step of deleting said initial execution environment.

\* \* \* \* \*